US008182321B2

(12) United States Patent
Chun

(10) Patent No.: US 8,182,321 B2
(45) **Date of Patent: *May 22, 2012**

(54) METHODS AND SYSTEMS FOR PLAYING BACCARAT JACKPOT

(76) Inventor: Jay Chun, Hong Kong (CN)

( * ) Notice: Subject to any disclaimer, the term of this patent is extended or adjusted under 35 U.S.C. 154(b) by 830 days.

This patent is subject to a terminal disclaimer.

(21) Appl. No.: 11/931,611

(22) Filed: Oct. 31, 2007

(65) Prior Publication Data

US 2008/0113778 A1 May 15, 2008

Related U.S. Application Data

(63) Continuation-in-part of application No. 11/042,732, filed on Jan. 24, 2005, now Pat. No. 7,918,723, and a continuation-in-part of application No. 11/198,218, filed on Aug. 5, 2005, and a continuation-in-part of application No. 11/874,158, filed on Oct. 17, 2007, and a continuation-in-part of application No. 11/800,885, filed on May 7, 2007.

(51) Int. Cl.
*A63F 13/00* (2006.01)
*A63F 1/04* (2006.01)
*A63F 1/12* (2006.01)
*A63F 1/14* (2006.01)

(52) U.S. Cl. ................ 463/12; 463/10; 463/11; 463/13; 463/26; 463/27; 463/28; 273/149 R; 273/292

(58) Field of Classification Search .............. 463/10–13, 463/26–28; 273/292, 149 R
See application file for complete search history.

(56) References Cited

U.S. PATENT DOCUMENTS 3,810,627 A 5/1974 Levy
3,909,002 A 9/1975 Levy
4,339,798 A 7/1982 Hedges
4,467,424 A 8/1984 Hedges
4,659,082 A 4/1987 Greenberg
4,861,041 A 8/1989 Jones
(Continued)

FOREIGN PATENT DOCUMENTS

CA 2377577 12/2000
(Continued)

OTHER PUBLICATIONS

International Search Report for PCT/CA2006/002069, mailed Mar. 20, 2007, 16 pgs.

(Continued)

*Primary Examiner* — David L Lewis
*Assistant Examiner* — William H McCulloch, Jr.
(74) *Attorney, Agent, or Firm* — Jennifer Meredith, Esq.; Meredith & Keyhani, PLLC

(57) ABSTRACT

A method and system for playing jackpot and casino games are provided. The method includes playing a baccarat or felt table game which allows a player to bet on jackpot and includes dealing cards to a player hand and a bank hand, allowing one player to place a bet on live baccarat or felt table game, allowing another player to place a bet on jackpot and determining the outcome of the live baccarat game according to the set of conventional casino game rules, and determining the outcome of the jackpot according to a combination of cards. Winning the jackpot is by from about 5% to about 100% of the jackpot. The system includes a betting terminal for playing the games according to the method.

21 Claims, 13 Drawing Sheets

U.S. PATENT DOCUMENTS

| | | | | |
|---|---|---|---|---|
| 4,926,327 | A * | 5/1990 | Sidley | 463/13 |
| 5,033,744 | A * | 7/1991 | Bridgeman et al. | 463/13 |
| 5,042,818 | A * | 8/1991 | Weingardt | 463/13 |
| 5,048,833 | A | 9/1991 | Lamle | |
| 5,362,064 | A | 11/1994 | Lofink | |
| 5,393,067 | A | 2/1995 | Paulsen | |
| 5,395,119 | A | 3/1995 | Jacob | |
| 5,395,120 | A * | 3/1995 | Malek | 273/292 |
| 5,476,259 | A | 12/1995 | Weingardt | |
| 5,605,334 | A | 2/1997 | McCrea | |
| 5,639,092 | A | 6/1997 | Macaisa | |
| 5,669,606 | A | 9/1997 | Brown | |
| 5,673,917 | A | 10/1997 | Vancura | |
| 5,707,287 | A | 1/1998 | McCrea | |
| 5,735,525 | A | 4/1998 | McCrea | |
| 5,762,552 | A | 6/1998 | Vuong | |
| 5,770,533 | A | 6/1998 | Franchi | |
| 5,779,546 | A | 7/1998 | Meissner | |
| 5,788,574 | A | 8/1998 | Ornstein | |
| 5,795,225 | A * | 8/1998 | Jones et al. | 463/13 |
| 5,800,268 | A | 9/1998 | Molnick | |
| 5,806,854 | A | 9/1998 | Coleman | |
| 5,830,067 | A | 11/1998 | Graves | |
| 5,836,818 | A | 11/1998 | Jones | |
| 5,842,698 | A | 12/1998 | Brown | |
| 5,876,283 | A | 3/1999 | Para et al. | |
| 5,909,876 | A | 6/1999 | Brown | |
| 5,911,626 | A | 6/1999 | McCrea | |
| 5,921,865 | A | 7/1999 | Scagnelli | |
| 5,957,459 | A | 9/1999 | Chae | |
| 5,961,119 | A | 10/1999 | Brown | |
| 6,001,016 | A | 12/1999 | Walker | |
| 6,019,374 | A | 2/2000 | Breeding | |
| 6,093,103 | A | 7/2000 | McCrea | |
| 6,117,012 | A | 9/2000 | McCrea | |
| 6,146,270 | A | 11/2000 | Huard | |
| 6,159,095 | A | 12/2000 | Frohm | |
| 6,217,447 | B1 | 4/2001 | Lofink | |
| 6,254,484 | B1 | 7/2001 | McCrea | |
| 6,279,910 | B1 | 8/2001 | de Keller | |
| 6,293,864 | B1 | 9/2001 | Romero | |
| 6,345,824 | B1 | 2/2002 | Selitzky | |
| 6,346,044 | B1 | 2/2002 | McCrea | |
| 6,361,437 | B1 | 3/2002 | Walker | |
| 6,409,602 | B1 | 6/2002 | Wiltshire | |
| 6,460,848 | B1 | 10/2002 | Soltys | |
| 6,508,709 | B1 | 1/2003 | Karmarkar | |
| 6,511,072 | B1 | 1/2003 | Santa Cruz et al. | |
| 6,517,436 | B2 | 2/2003 | Soltys | |
| 6,540,230 | B1 | 4/2003 | Walker et al. | |
| 6,569,018 | B2 | 5/2003 | Jaff | |
| 6,575,834 | B1 | 6/2003 | Lindo | |
| 6,582,301 | B2 | 6/2003 | Hill | |
| 6,588,758 | B1 * | 7/2003 | Lee | 273/292 |
| 6,626,757 | B2 | 9/2003 | Oliveras | |
| 6,628,244 | B1 | 9/2003 | Hirosawa | |
| 6,712,696 | B2 | 3/2004 | Soltys | |
| 6,719,291 | B1 | 4/2004 | deKeller | |
| 6,726,564 | B2 | 4/2004 | Hogan | |
| 6,755,741 | B1 | 6/2004 | Rafaeli | |
| 6,800,026 | B2 | 10/2004 | Cannon | |
| 6,808,173 | B2 | 10/2004 | Snow | |
| 6,837,494 | B2 | 1/2005 | Lee | |
| 6,896,614 | B2 | 5/2005 | Romero | |
| 6,916,245 | B1 | 7/2005 | Vancura | |
| 7,008,319 | B2 | 3/2006 | Montgomery | |
| 7,070,505 | B2 | 7/2006 | Vancura et al. | |
| 7,114,724 | B2 | 10/2006 | Ritzer | |
| 7,189,161 | B1 | 3/2007 | Wiltshire | |
| 7,198,272 | B2 | 4/2007 | Duhamel | |
| 7,213,812 | B2 | 5/2007 | Schubert | |
| 7,264,241 | B2 | 9/2007 | Schubert | |
| 7,303,475 | B2 | 12/2007 | Britt | |
| 7,309,065 | B2 | 12/2007 | Yoseloff | |
| 7,316,615 | B2 | 1/2008 | Soltys | |
| 7,325,806 | B1 | 2/2008 | Feola | |
| 7,367,884 | B2 | 5/2008 | Breeding | |
| 7,404,765 | B2 | 7/2008 | Soltys | |
| 7,407,438 | B2 | 8/2008 | Schubert | |
| 7,419,160 | B1 | 9/2008 | D'Ambrosio | |
| 7,434,805 | B2 | 10/2008 | Grauzer | |
| 7,451,987 | B1 | 11/2008 | Feola | |
| 7,591,728 | B2 | 9/2009 | Gioia | |
| 7,621,533 | B2 | 11/2009 | Kenny | |
| 7,731,586 | B2 | 6/2010 | Letovsky | |
| 7,735,657 | B2 | 6/2010 | Johnson | |
| 7,753,798 | B2 | 7/2010 | Soltys | |
| 7,762,889 | B2 | 7/2010 | Shijeta | |
| 7,769,232 | B2 | 8/2010 | Downs | |
| 7,780,515 | B2 | 8/2010 | Okada | |
| 7,914,368 | B2 * | 3/2011 | Chun | 463/12 |
| 7,918,723 | B2 * | 4/2011 | Chun | 463/12 |
| 7,922,587 | B2 * | 4/2011 | Chun | 463/42 |
| 2001/0000118 | A1 | 4/2001 | Sines et al. | |
| 2001/0029200 | A1 | 10/2001 | Romero | |
| 2002/0002070 | A1 | 1/2002 | Romero | |
| 2002/0002073 | A1 | 1/2002 | Montgomery | |
| 2002/0015489 | A1 | 2/2002 | Ben-David | |
| 2002/0068635 | A1 | 6/2002 | Hill | |
| 2002/0072407 | A1 | 6/2002 | Soltys | |
| 2002/0094869 | A1 | 7/2002 | Harkham | |
| 2002/0111205 | A1 | 8/2002 | Beavers | |
| 2002/0147042 | A1 | 10/2002 | Vuong | |
| 2002/0147047 | A1 | 10/2002 | Letovsky | |
| 2003/0003997 | A1 | 1/2003 | Vuong | |
| 2003/0013510 | A1 | 1/2003 | Vuong | |
| 2003/0050107 | A1 * | 3/2003 | Moody | 463/13 |
| 2003/0064781 | A1 * | 4/2003 | Muir | 463/20 |
| 2003/0069071 | A1 | 4/2003 | Britt | |
| 2003/0104854 | A1 | 6/2003 | Cannon | |
| 2003/0151199 | A1 | 8/2003 | Lee | |
| 2003/0151201 | A1 | 8/2003 | Lee | |
| 2003/0232651 | A1 | 12/2003 | Huard | |
| 2004/0023712 | A1 | 2/2004 | Oliver | |
| 2004/0023722 | A1 | 2/2004 | Vuong | |
| 2004/0087357 | A1 | 5/2004 | Johnson | |
| 2004/0108656 | A1 | 6/2004 | Snow | |
| 2004/0116179 | A1 | 6/2004 | Nicely | |
| 2004/0224777 | A1 | 11/2004 | Smith | |
| 2004/0235542 | A1 | 11/2004 | Stronach | |
| 2005/0062227 | A1 | 3/2005 | Grauzer et al. | |
| 2005/0073102 | A1 | 4/2005 | Yoseloff et al. | |
| 2005/0218597 | A1 | 10/2005 | Parsadaian | |
| 2005/0233794 | A1 | 10/2005 | Cannon | |
| 2006/0052168 | A1 | 3/2006 | Shacham | |
| 2006/0063577 | A1 | 3/2006 | Downs | |
| 2006/0071429 | A1 | 4/2006 | Okujyo | |
| 2006/0103071 | A1 | 5/2006 | Ritzer | |
| 2006/0128472 | A1 | 6/2006 | Beavers | |
| 2006/0148547 | A1 | 7/2006 | Montgomery | |
| 2006/0166726 | A1 * | 7/2006 | Chun | 463/12 |
| 2006/0178181 | A1 * | 8/2006 | Chun | 463/12 |
| 2006/0226605 | A1 | 10/2006 | Kenny | |
| 2006/0287042 | A1 | 12/2006 | Osawa | |
| 2006/0287058 | A1 | 12/2006 | Resnick | |
| 2007/0026922 | A1 | 2/2007 | Coplein | |
| 2007/0026947 | A1 * | 2/2007 | Chun | 463/42 |
| 2007/0032283 | A1 * | 2/2007 | Chun | 463/12 |
| 2007/0060259 | A1 | 3/2007 | Pececnik | |
| 2007/0135204 | A1 | 6/2007 | Nicely | |
| 2007/0155512 | A1 | 7/2007 | Wells et al. | |
| 2007/0218968 | A1 | 9/2007 | Snow | |
| 2007/0243927 | A1 | 10/2007 | Soltys | |
| 2007/0243929 | A1 | 10/2007 | Skotarczak | |
| 2007/0243935 | A1 | 10/2007 | Huizinga | |
| 2008/0009334 | A1 | 1/2008 | Walker et al. | |
| 2008/0026807 | A1 | 1/2008 | Moshal | |
| 2008/0076499 | A1 | 3/2008 | Lowery | |
| 2008/0085769 | A1 | 4/2008 | Lutnick | |
| 2008/0108400 | A1 * | 5/2008 | Chun | 463/10 |
| 2008/0113778 | A1 * | 5/2008 | Chun | 463/26 |
| 2008/0113783 | A1 | 5/2008 | Czyzewski | |
| 2008/0146311 | A1 | 6/2008 | Walker et al. | |
| 2008/0194334 | A1 | 8/2008 | Kuok | |
| 2008/0230993 | A1 * | 9/2008 | Chun | 273/292 |
| 2008/0254881 | A1 | 10/2008 | Lutnick | |
| 2008/0280667 | A1 | 11/2008 | Chun | |

| | | | | |
|---|---|---|---|---|
| 2008/0280668 | A1 | 11/2008 | Chun | |
| 2008/0305855 | A1 | 12/2008 | Czyzewski | |
| 2009/0029755 | A1 * | 1/2009 | Chun | 463/13 |
| 2009/0061974 | A1 * | 3/2009 | Lutnick et al. | 463/13 |
| 2009/0069079 | A1 * | 3/2009 | Britt et al. | 463/25 |
| 2009/0115133 | A1 * | 5/2009 | Kelly et al. | 273/274 |
| 2009/0176547 | A1 | 7/2009 | Katz | |
| 2009/0221360 | A1 | 9/2009 | Wooding | |
| 2010/0102511 | A1 | 4/2010 | Tammesoo | |
| 2010/0105457 | A1 | 4/2010 | Miller | |
| 2010/0105459 | A1 | 4/2010 | Miller | |
| 2010/0113119 | A1 | 5/2010 | Miller | |
| 2010/0117299 | A1 | 5/2010 | Nicely | |
| 2010/0222133 | A1 | 9/2010 | Spencer | |
| 2010/0255897 | A1 | 10/2010 | Pececnik | |
| 2010/0295247 | A1 | 11/2010 | Laduca | |
| 2011/0031694 | A1 | 2/2011 | Cohen | |
| 2011/0039612 | A1 | 2/2011 | Pececnik | |
| 2011/0105207 | A1 * | 5/2011 | Chun | 463/11 |
| 2011/0140362 | A1 * | 6/2011 | Chun | 273/292 |
| 2011/0159965 | A1 * | 6/2011 | Chun | 463/42 |

FOREIGN PATENT DOCUMENTS

| | | |
|---|---|---|
| EP | 1 101513 | 5/2001 |
| EP | 1892683 | 2/2008 |
| GB | 2408696 | 6/2005 |
| GB | 2430385 | 3/2007 |
| WO | WO0079467 | 12/2000 |
| WO | WO0217841 | 3/2002 |
| WO | WO2005056134 | 6/2005 |
| WO | WO2007016035 | 2/2007 |
| WO | WO2007099334 | 9/2007 |
| WO | 2008026950 | 3/2008 |
| WO | 2008092385 | 8/2008 |
| WO | 2009107131 | 9/2009 |

OTHER PUBLICATIONS

International Search Report for PCT/CA2006/001295, mailed Nov. 2, 2006, 17 pgs.
*EZ Baccarat*, DP Stud, Inc., www.ezbaccarat.com, 2 pgs. (2003).

* cited by examiner

FIG. 4A
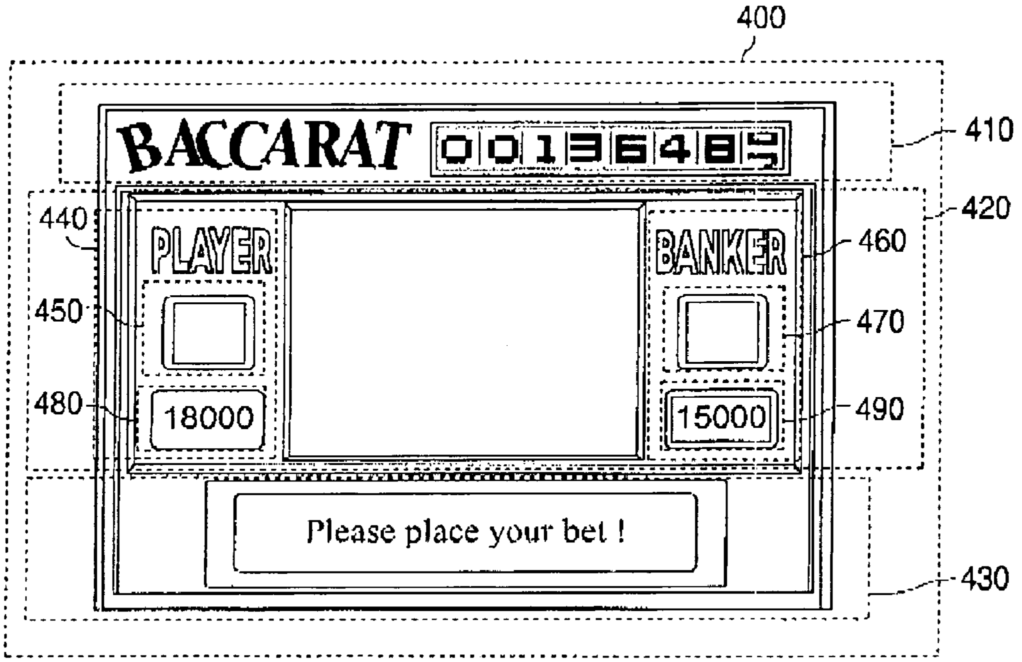
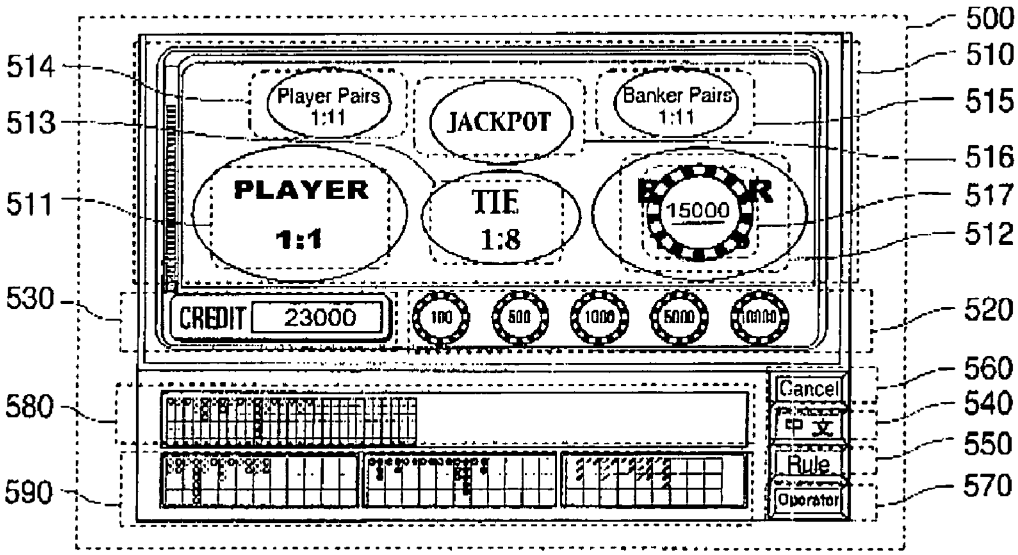
FIG. 4B

METHODS AND SYSTEMS FOR PLAYING BACCARAT JACKPOT

CROSS REFERENCE TO RELATED APPLICATIONS

This application is a continuation-in-part application of U.S. application Ser. No. 11/042,732, filed on Jan. 24, 2005 now U.S. Pat. No. 7,918,723. This application is also a continuation-in-part application of U.S. application Ser. No. 11/198,218, filed on Aug. 5, 2005. This application is also a continuation-in-part application of U.S. application Ser. No. 11/874,158, filed on Oct. 17, 2007. This application is also a continuation-in-part application of U.S. application Ser. No. 11/800,885, filed on May 7, 2007. The teachings in these four applications are incorporated herein in their entirety by reference.

BACKGROUND OF THE INVENTION

The present invention is generally directed to a method of play and apparatus for playing a casino game that allows a player to bet on jackpot.

Baccarat is one of the more popular gambling games played in casinos or gaming establishments. As is well known, the game is played on an elongated table having a game board displayed along the upper surface of the table. The game board displays certain wagering areas, and the elongated table allows for the seating of multiple players or bettors (1-16) and the positioning of the multiple dealers (3) necessary for operating the casino game. Bettor locations are typically numbered on the table and each bettor location has an area designated for a wager on the bank hand and an area designated for a wager on the player hand. Baccarat uses a standard deck of 52 playing cards and is usually dealt from a shoe having multiple decks that have been shuffled together prior to the beginning of play.

A feature of conventional baccarat games is that they have relatively simple rules. However, the simplicity of the rules has led to a corresponding simplicity in the relatively few types of wagers which may be placed during the play of the game, which may limit interest on the part of the player(s) and thus further limit the casino in terms of profit and payout.

The embodiments described below address the above-described issues and needs.

SUMMARY OF THE INVENTION

Provided herein are methods and systems therefore for playing a modified live baccarat game. The methods allow the wagering on the live baccarat games or felt table games according to conventional rules. In addition, the methods provided herein allow betting on a site bet or wager for jackpot. In some embodiments, outcomes of the jackpot betting can be determined by combinations of cards that involve at least one zero-point card, described below. In some other embodiments, outcomes of the jackpot betting can be determined by specific combinations of cards defined below. The present invention also provides a jackpot gaming method that allows the banker to make initial contributions for the jackpot game.

The method for playing live baccarat described herein includes the following steps:

dealing cards to a player hand and a bank hand according to a set of conventional baccarat rules, allowing at least a first player to place a bet on live baccarat felt table game, allowing at least a second player to place a bet on jackpot where the second player can be the same as or different from the first player, determining the outcome of the live baccarat game or felt table game according to the set of conventional baccarat rules, and determining the outcome of the jackpot according to a combination of cards defined herein.

The present invention also discloses a software program or a set of software programs for carrying out any or all steps of the betting method described herein. The live baccarat game can also be incorporated into an electronic device or an entertainment gaming machine.

BRIEF DESCRIPTION OF DRAWINGS

FIGS. 4A and 4B show the detailed layout of the betting terminal of a baccarat machine.

DETAILED DESCRIPTION

Figure 1:
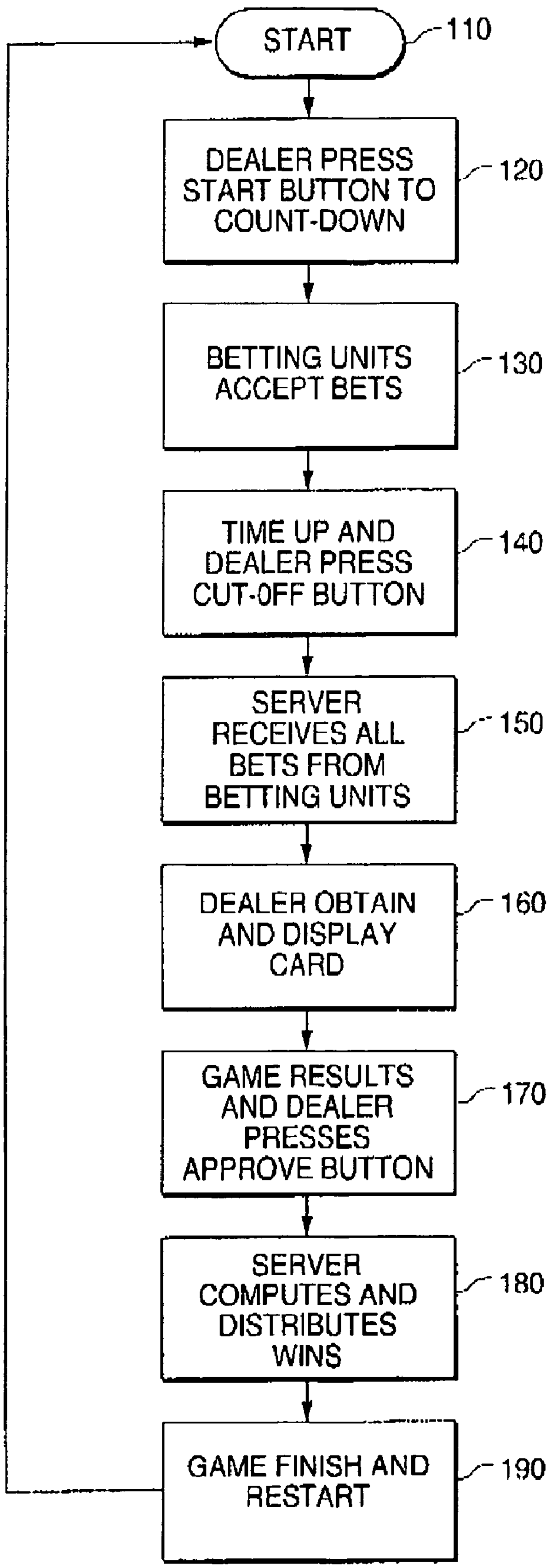
FIG. 1 is a flow chart disclosing the incorporation of the present betting methods in the game of baccarat.

Provided herein are methods and systems therefore for playing a modified live baccarat game. The methods allow the wagering on the live baccarat games or felt table games according to conventional rules. In addition, the methods provided herein allow betting on a site bet or wager for jackpot. The present invention also provides a jackpot gaming method that allows the banker to make initial contributions for the jackpot game. As used herein, a zero-point card refers to any of the 10, J, Q, or K, and the banker refers to one who owns or operates the live baccarat establishment.

In general, the method for playing the jackpot described herein includes the following steps:

dealing cards to a player hand and a bank hand according to a set of conventional baccarat rules, allowing at least a first player to place a bet on live baccarat or felt table game, allowing at least a second player to place a bet on jackpot where the second player can be the same as or different from the first player, determining the outcome of the live baccarat game according to the set of conventional baccarat or felt table game rules, and determining the outcome of the jackpot according to a combination of cards defined below.

In some embodiments, the outcome of the jackpot can be a winning jackpot by from 1% to 100% of the jackpot, e.g., about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% of the jackpot. As used herein, the term "about" shall encompass any percentage that falls within ±5% of the indicated value.

Live baccrat games and felt table games are well known in the art. Examples of felt table games include, e.g., a Roulette game, a Black Jack & Craps game, a Sic Bo game, or a Fish-Prawn-Crab game. The rules of playing these games are well established. Rules of a few examples of these games are described below for illustration only and shall not be construed to limit the scope of the present invention.

The present invention also provides a software program or a set of software programs for carrying out any or all steps of the betting method described herein. The baccarat game can also be incorporated into an electronic device or an entertainment gaming machine. Representative electronic devices include, but are not limited to, laptop computers or desktop computers.

Live Baccarat Game

The object of baccarat is for the bettor to successfully wager on whether the bank's hand or the player's hand is going to win. The bettor receives even money for his wager if he selects the winning hand and loses his wager if he selects the losing hand. Because of the rules of play of baccarat, the bank's hand has a slightly higher chance of winning than does the player's hand. Therefore, if the bettor wagers on the bank's hand, the bettor is required to pay to the gaming establishment a commission (typically 5%) of the amount the bettor wins. No commission is paid if the bettor successfully wagers on the player's hand.

The term "wager", as used herein, can be used interchangeably with the term "bet." The term "wagering" is used interchangeably with the term "betting."

Conventional methods of playing baccarat are described as follows:

A multiple number of decks of standard playing cards, 52 in number, are used; typically six to twelve decks are shuffled together and placed in a shoe from which the cards are dealt during the play of the game.

Each bettor makes a wager on whether the bank's hand or the player's hand will win. After all wagers are made, two cards are dealt from the shoe to the bank position and two cards are dealt from the shoe to the player's position on the table layout. The cards are turned face up and the value of the bank hand and the player hand is determined.

Aces count as one; kings, queens, jacks and tens count as zero and the other cards count as their respective face value. The suits (hearts, diamonds, spades and clubs) have no meaning in baccarat. The highest hand value in baccarat is nine. All hand values range from a low of zero to a high of nine. If when the cards are added together, the total of the hand exceeds nine, then the hand value is determined by subtracting ten from the total of the hand. For example, a seven and nine total sixteen, but the hand value is six. An Ace and a nine total ten, but the hand value is zero.

A two card total of eight or nine is called a "natural"; a two card total of zero is called a "baccarat". As will be explained hereafter, in certain situations in the play of the game, a third card will be dealt. The value of this third card is added to the total of the first two cards and a new hand value is established. Again, if the new hand total exceeds nine, the hand value is determined by subtracting ten from the total of the hand. Wagering locations are provided on the baccarat table layout. Whichever of the bank hand or the player hand is closest to a total of nine is the winner.

The way of betting may differ in different gaming establishments. In the U.S., for example, prior to the deal, each bettor can make one of three wagers: 1) that the bank hand will win, 2) that the player hand will win, or 3) that the bank hand and the player hand will tie. In Macau, for example, one can make one of five wagers: 1) that the bank hand will win, 2) that the player hand will win, 3) that the bank hand and the player hand will tie, 4) that the first two cards in the bank hand are of the same kind, regardless of the type of suit, forming a Bank Pair, or (5) that the first two cards in the player hand are of the same kind, regardless of the type of suit, forming a Player Pair.

All winning bank hand wagers in scenario 1) in both the U.S. and Macau are paid off at odds of one-to-one and the house charges a five percent (5%) commission on the amount won by the bettor. For example, if a bettor wagers $100 on the bank hand and the bank hand wins, the bettor wins $100 and is charged a $5 commission on the amount that the bettor won. The bettor is not charged any commission on the amount of his wager.

All wagers that select winning player hand in scenario 2) in both the U.S. and Macau are paid off at odds of one-to-one and the bettor is not charged any commission on the amount of his winnings or his wager.

All winning wagers on the tie in scenario 3) in both the U.S. and Macau can be paid off at odds of eight-to-one (depending on the gaming establishment) and the bettor is not charged any commission on the amount of his winnings or his wager. If a tie hand occurs, all wagers on the bank hand and all wagers on the player hand are "pushes" and the amount wagered is returned to the bettor.

All winning wagers on the Bank Pair bet in scenario 4) in Macau can be paid off at odds of eleven-to-one (depending on the gaming establishment) and the bettor is not charged any commission on the amount of his winnings or his wager.

All winning wagers on the Player Pair bet in scenario 5) in Macau can be paid off at odds of eight-to-one (depending on the gaming establishment) and the bettor is not charged any commission on the amount of his winnings or his wager.

The play of baccarat typically uses three casino dealers to operate the game. The casino dealers jointly participate in the shuffling of the decks of cards. After the shuffle is completed, one of the players is typically asked to cut the decks using a plastic cut card. The dealer then separates and restacks the cards from the point of the cut and the dealer or a player then inserts the plastic cut card no less than fifteen cards (in Las Vegas, U.S.) or no less than twelve cards (in Macau) from the ends of the stacked decks and the entire stacked decks are placed into a shoe from which the cards are dealt during the play of the game. When the inserted plastic cut card appears during play, the hand in progress is completed and that round of play then ends. The cards are reshuffled to prepare for the next round of baccarat.

In conventional baccarat, the bettors deal the cards used in the game. Initially, one of the casino dealers (called the "caller") passes the shoe to the bettor sitting in seat number "1" at the baccarat table. After all wagers have been made, the caller tells the bettor with the shoe to begin the deal. The bettor deals a first card to the caller, a first card to himself, a second card to the caller and a second card to himself. All cards are dealt face down. The two cards given to the caller represent the player hand and the two cards kept by the bettor who is dealing the cards represent the bank hand.

The caller than allows one of the other bettors to turn up the player's hand. Traditionally, this honor is given to the bettor who has made the largest wager. The bettor turns up the two cards of the player's hand and tosses them to the caller. The caller places these two cards face up in the table location designated for the "player hand" and the caller announces the point total of the player hand.

The bettor who has the shoe then turns over the cards of the bank hand and tosses these two cards to the caller. The caller places these two cards face up in the table location designated for the "bank hand" and the caller announces to point total of the bank hand. Depending on the point total of the player's hand and the bank's hand, one more card may be dealt to either the player's hand, the bank's hand, or both. The rules for determining whether a third card is dealt are fixed rules, there is no discretion for either the player's hand or the bank's hand on whether a third card is dealt.

If either the player hand or the bank hand has a point total of eight or nine on the first two cards, no third card is dealt to either hand and the hand with the highest point total is the winner (or the hand is a tie, as the case may be). If neither the player hand or the bank hand has a point total of eight or nine, then there is a possibility of a third card draw.

The third card draw rules are as follows:

Rule #1: If the initial two card player hand has a point total of 0, 1, 2, 3, 4 or 5, draws a third card. If the initial two card player hand has a point total of 6 or 7, the player hand stands and does not receive a third card.

Rule #2: If the player hand stands and does not draw a third card, then the bank hand follows Rule #1. In other words, if the player hand has a point total of 6 or 7, the bank hand draws a third card on a point total of 0, 1, 2, 3, 4 or 5 and the bank hand stands on a point total of 6 or 7.

Rule #3: If the player hand draws a third card, the bank hand must draw or stand as described in Table 1.

TABLE 1

| Bank hand two card point total | Bank hand draws when the player's hand third card is: | Bank hand stands when the player's hand third card is: |
|---|---|---|
| 0, 1 or 2 | Bank always draws | — |
| 3 | 0, 1, 2, 3, 4, 5, 6, 7 or 9 | 8 |
| 4 | 2, 3, 4, 5, 6 or 7 | 0, 1, 8 or 9 |
| 5 | 4, 5, 6 or 7 | 0, 1, 2, 3, 8 or 9 |
| 6 | 6 or 7 | 0, 1, 2, 3, 4, 5, 8 or 9 |
| 7 | — | Bank always stands |

All third card draw determinations are automatically made by the caller who is skilled in the game of baccarat. When the rules of baccarat require a third card for the player hand, the caller will request a card for the player hand. After the player hand is completed, the bank hand is completed in the same fashion. The caller then declares which hand has the highest point total and declares that hand the winner (or the caller declares a tie hand as the case may be).

In conventional baccarat the bettor who acts as the dealer continues to deal the cards until the player hand wins. As soon as the player hand wins, it is customary to pass the shoe counterclockwise around the baccarat table to the next bettor so that each bettor has the opportunity to deal the cards. Any bettor may decline to deal the cards. The fact that one of the bettors is physically dealing the cards has no affect on the outcome of the game because the rules for drawing and standing do not allow any discretion on the part of the players.

In some embodiments, the players can play the game according to conventional baccarat rules, which may vary from place to place. In one embodiment, the baccarat game is played according to the U.S. rules as used in Las Vegas. In another embodiment, the baccarat game is played according to the baccarat rules promulgated by the government of Macau Special Administration Region.

In some embodiments, there is a maximum limit on the total bet can be made through a single betting terminal for the live baccarat game. In one embodiment, the maximum bet can be made through one terminal for live baccarat is, for example, HK$20,000.

Roulette

Roulette games are generally grouped into two categories: the European Roulette or English Roulette or the American Roulette. The following provides a general description of the game of Roulette and the rules playing the game.

American Roulette

The Wheel

The game of American Roulette is played on a wheel which consists of thirty-eight slots, each with its own number. The numbers on a Roulette wheel are 1-36, 0, and 00. The numbers alternate pairs of odd numbers with pairs of even numbers. The numbers also alternate between black and red. Both the 0 and 00 slots are green. A dealer, or croupier spins the wheel in one direction and then rolls a small ball in the other direction. The ball then drops into one of the slots as it begins to slow down.

The Table

The table is designed so that the numbers, not including 0 and 00, are lined up into three columns, each of twelve numbers, the first row is 1, 2, 3; the second row is 4, 5, 6 and so on. The rest of the table is devoted to the myriad bets the game entails. Betting is broken down into two major categories, inside bets and outside bets. There is no limit to the number of bets one can play Inside Bets Straight Bets This is betting that one particular number on the wheel will come up. This bet is done by placing a chip on top of the number on which you want to bet. If that number wins, the payoff is 35 to 1.

Split Bets

This is betting that one of two numbers that lie next to each other on the table will win. Placing a chip on the line that separates two numbers does this. You win if the ball lands on either number. The payoff is 17 to 1.

Street Bet, Trio Bet, or Three Number Bet

In this bet, a player is wagering that any number in a particular row will hit on the next spin. To make this bet, you must place a chip in the outside line of the row on which you want to bet. You win if any number in the row comes up. The payoff is 11 to 1.

Corner Bet, Square Bet, or Four-Number Bet

This bets that one of four numbers will hit on the next spin. The numbers should all be touching and moving a chip into the center of four numbers places the bet. If one of these numbers comes up, you win. This bets pays 8 to 1.

Five-Number Bet

This is betting that either the 0, 00, 1, 2, or 3 will come up on the next roll. To take this bet, place a chip on the outside line that divides the 0 and 1. You will be paid 6 to 1 if any of these numbers come up.

Six Line Bet

This is betting that one of six numbers in two adjacent rows will come up. Place a chip in between two rows on the outside line. If the ball lands on any number in the two rows, you will be paid 6 to 1.

Outside Bets

Red

You are betting that the next number to come up is a red. If the next number landed is red, you will be paid 1 to 1, or even money. To play this bet, place a chip on the box marked "Red".

Black

You are betting that the next number to come up is a black. If the next number landed is black, you will be paid 1 to 1, or even money. To play this bet, place a chip on the box marked "Black".

Even

This is wagering that the ball will land on an even number. This bet does not include 0 or 00. The payoff is 1 to 1. To play this bet, place a chip on the box marked "Even".

Odd

This is wagering that the ball will land on an odd number. The payoff is 1 to 1 if the next number to come up is odd. To play this bet, place a chip on the box marked "Odd".

Low Bet

This is a bet that the next number will be between 1 and 18. The payout is 1 to 1. To play this bet, place a chip on the box marked "Low".

High Bet

This is a bet that the next number will be between 19 and 36. The payout is 1 to 1. To play this bet, place a chip on the box marked "High".

Dozen Bet

These bets divide the table into the numbers 1-12, 13-24, and 25-36. To play this bet, put a chip in one of the three boxes marked "1st 12", "2nd 12" or "3rd 12". This bet pays 2 to 1.

Column Bet

This bets that a number in a particular column will come up on the next spin. The payoff is 2 to 1 and is done by placing a chip at the end of the layout below your desired column where it is marked "2 to 1".

English Roulette

The major difference between English and American Roulette is that English has only a 0 instead of both 0 and 00.

Sic Bo

Sic Bo is an ancient Chinese game meaning 'Dice Pair'. It is played in Southeast Asia, Korea, Nevada and Australia. It is also popular in the Philippines, where it is called 'Hi-Lo'. Sic Bo is played with three dice. The object of the game is to select the individual numbers, or combinations of numbers, that will appear on the dice after the 'throw'.

The possibilities include single dice numbers, two of a kind, three of a kind, or combinations of any two or three of the dice. These are displayed along with payoff odds on the table's layout.

To start, the players make their selection of a possible outcome and place a bet on a chosen possibility. After the bets are made, the dice tumbler is rotated and then set on the table. All winning possibilities of the three dice appear illuminated on the layout.

Winning payoffs range from 1:1 even money for one-of-a-kind, to 180:1 for a specific trio.

Jackpot

The method and system described herein provide a method for jackpot betting, Paradise Jackpot™. The players of the live baccarat game or a felt table game can make a separate bet for jackpot. The jackpot bet can be placed with a bet for live baccarat or felt table game or without a bet for the same live baccarat felt table game.

In some embodiments, the outcome of the jackpot betting is determined by the combination of cards that includes zero-point or non-zero-point cards. The combination includes at least one zero-point cards, which are 10, J, Q and K. In one embodiment, the rules for playing Paradise Jackpot™ are described below:

(1) The gaming system provides a jackpot. Players who wish to bet on the Paradise Jackpot™ can place a separate bet, e.g. HKD 20 per game in minimum, which will be referred to as bet unit. The maximum number of bet units will not be restricted.

(2) Players can bet in Paradise Jackpot™ without placing bet in the same live baccarat game. Each player can place more than one bet unit in one game. When the Paradise Jackpot™ is won, the payout for each bet unit will be equal to the money in the Paradise Jackpot™ pool divided by the total number of bet unit.

(3) If the first 5 cards drawn in one baccarat game resulting in A, K, Q, J, 10 in spade, regardless of the sequence, then 100% of the Paradise Jackpot™ is won.

(4) If the first 5 cards drawn in one baccarat game resulting in K, Q, J, 10 in spade and A in either heart, club or diamond, regardless of the sequence, then 10% of the Paradise Jackpot™ is won. In some embodiments, the winning combinations for 10% of the jackpot can be any of the following Spade A plus K, Q, J, 10 in Heart, Club or Diamond;

Heart A plus K, Q, J, 10 in Spade, Club or Diamond;

Club A plus K, Q, J, 10 in Spade, Heart or Diamond; or

Diamond A plus K, Q, J, 10 in Spade, Heart, or Club.

In some other embodiments, the Paradise Jackpot™ can be played according to Rules (I)-(III), defined below:

(I) The Paradise Jackpot™ is won if any of the following is met:

1) any five cards forming a sequence, regardless of the order they are drawn, e.g., A, 2, 3, 4, 5 or 9, 10, J, Q, K;

2) five cards of a kind, e.g. A, A, A, A, A or K, K, K, K, K;

3) four cards of a kind, regardless of the order they are drawn, e.g., K, K, K, K, 2 or 2, K, K, K, K;

4) three cards of a kind plus a pair, regardless of the order they are drawn, e.g., 10, 10, 10, 2, 2;

5) three cards of a kind, regardless of the order they are drawn, e.g., 2, 2, 2, 10, J 6) two pairs, regardless of the order they are drawn, e.g., Q, Q, 2, K, K;

7) all the 5 cards of the same symbols (same suit): spade, heart, club or diamond, e.g., A (spade), 10(spade), J (spade), K (spade), Q (spade); or 8) any specific combination of five cards as specified from time to time.

(II) The Paradise Jackpot™ is won by any specific combination of the first four, three or two cards drawn in a live baccarat game, with regard to/regardless of the drawn sequence. Specifically, the Paradise Jackpot™ is won if any of the following is met:

(A) if the first four cards that are drawn form a combination as defined below:

1) the first four cards forming a sequence, with regard to/regardless of the order they are drawn, e.g., A, 2, 3, 4, or 10, J, Q, K;

2) the first four cards of a kind, e.g. A, A, A, A or J, J, J, J;

3) three cards of a kind, with regard to/regardless of the order they are drawn, e.g., K, K, K, 2 or 10, 10, 10, 2;

4) two cards of a kind plus a pair, with regard to/regardless of the order they are drawn, e.g., 2, 2, J, J, which is a two pair sequence;
5) two cards of a kind, with regard to/regardless of the order they are drawn, e.g., 10, 10, Q, Q;
6) all the four cards of the same symbols (same suit): spade, heart, club or diamond, e.g., A (spade), 10(spade), J (spade), K (spade); or
7) any specific combination of the first four cards as specified from time to time, (B) if the first three cards that are drawn form a combination as defined below:
1) the first three cards forming a sequence, with regard to/regardless of the order they are drawn, e.g., A, 2, 3, or 10, J, K;
2) the first three cards of a kind, e.g. A, A, A or 2, 2, 2;
3) two cards of a kind, with regard to/regardless of the order they are drawn, e.g., K, K, 2 or 10, 10, 2;
4) two cards forming a pair, with regard to/regardless of the order they are drawn, e.g., 2, J, J or J, J, 2;
5) all the three cards of the same symbols (same suit): spade, heart, club or diamond, e.g., A (spade), J (spade), K (spade); or
6) any other specific combination of the first four cards as specified from time to time, or (C) if the first two cards that are drawn form a combination as defined below:
1) the first two cards forming a sequence, with regard to/regardless of the order they are drawn, e.g., A, 2, or J, Q;
2) the first two cards of a kind, e.g. A, A or 10, 10, which is also a pair;
3) the first two cards of the same symbols (same suit): spade, heart, club or diamond, e.g., A (spade), 10(spade); or
4) any other specific combination of the first four cards as specified from time to time.

(III) The Paradise Jackpot™ is won by any specific combination of the last six, five, four, three, and two cards drawn in a live baccarat game, with regard to/regardless of the drawn sequence. Specifically, the Paradise Jackpot™ is won if any of the following is met:

(A) if the last six cards that are drawn form a combination as defined below:
1) the last six cards forming a sequence, with regard to/regardless of the drawn sequence they are drawn, e.g., A, 2, 3, 4, 5, 6 or 8, 9, 10, J, Q, K;
2) six cards of a kind, e.g. A, A, A, A, A, A or 2, 2, 2, 2, 2, 2;
3) five cards of a kind, with regard to/regardless of the order they are drawn, e.g., K, K, K, K, K, 2 or 2, 10, 10, 10, 10, 10;
4) four cards of a kind, with regard to/regardless of the order they are drawn, e.g., K, K, K, K, 2, 10 or 2, A, J, J, J, J;
5) four cards of a kind plus a pair, with regard to/regardless of the order they are drawn, e.g., K, K, K, K, 2, 2 or 2, 2, J, J, J, J;
6) three cards of a kind plus a pair, with regard to/regardless of the order they are drawn, e.g., 2, 2, 2, J, J, A or J, J, 2, 2, 2, K;
7) three cards of a kind, with regard to/regardless of the order they are drawn, e.g., A, A, A, 10, J, K or 10, J, K, 2, 2, 2;
8) three pairs, with regard to/regardless of the order they are drawn, e.g., Q, Q, K, K, J, J or 2, 2, 10, 10, K, K;
9) all the six cards of the same symbols (same suit): spade, heart, club or diamond, e.g., A (spade), 10(spade), J (spade), K (spade), Q (spade), 2(spade); or
10) any other specific combination of six cards as specified from time to time.

(B) if the last five cards that are drawn form a combination as defined below:
1) the last five cards forming a sequence, with regard to/regardless of the order they are drawn, e.g., A, 2, 3, 4, 5 or 9, 10, J, Q, K;
2) five cards of a kind, e.g. A, A, A, A, A or 2, 2, 2, 2, 2;
3) four cards of a kind, with regard to/regardless of the order they are drawn, e.g., K, K, K, K, 2 or 2, 10, 10, 10, 10;
4) three cards of a kind plus a pair, regardless of the order they are drawn, e.g., 2, 2, 2, J, J;
5) three cards of a kind, regardless of the order they are drawn, e.g., 2, 2, 2, 10, Q;
6) two pairs, regardless of the order they are drawn, e.g., Q, Q, A, 10, 10;
7) all the 5 cards of the same symbols (same suit): spade, heart, club or diamond; e.g., A (spade), 10(spade), J (spade), K (spade), Q (spade); or
8) any other specific combination of five cards as specified from time to time, (C) if the last four cards that are drawn form a combination as defined below:
1) the last four cards forming a sequence, with regard to/regardless of the order they are drawn, e.g., A, 2, 3, 4, or 10, J, Q, K;
2) the last four cards of a kind, e.g. A, A, A, A or 10, 10, 10, 10;
3) three cards of a kind, with regard to/regardless of the order they are drawn, e.g., K, K, K, 2 or 10, 10, 10, 2;
4) two cards of a kind plus a pair, regardless of the order they are drawn, e.g., A, A, J, J, which is a two pair sequence;
5) two cards of a kind, regardless of the order they are drawn, e.g., 2, 2, Q, Q;
6) all the four cards of the same symbols (same suit): spade, heart, club or diamond, e.g., A (spade), 10(spade), K (spade), Q (spade); or
7) any other specific combination of the first four cards as specified from time to time, (D) if the last three cards that are drawn form a combination as defined below:
1) the last three cards forming a sequence, with regard to/regardless of the order they are drawn, e.g., A, 2, 3, or J, Q, K;
2) the last three cards of a kind, e.g. A, A, A or Q, Q, Q;
3) two cards of a kind, with regard to/regardless of the order they are drawn, e.g., K, K, 2 or 10, 10, 2;
4) two cards forming a pair, with regard to/regardless of the order they are drawn, e.g., 2, J, J or J, J, 2;
5) all the last three cards of the same symbols (same suit): spade, heart, club or diamond, e.g., A (spade), J (spade), K (spade); or
6) any other specific combination of the first four cards as specified from time to time, (E) if the last two cards that are drawn form a combination as defined below:
1) the last two cards forming a sequence, with regard to/regardless of the order they are drawn, e.g., A, 2, or 10, J;
2) the last two cards of a kind, e.g. A, A or 2, 2, which is also a pair;

3) the last two cards of the same symbols (same suit): spade, heart, club or diamond, e.g., A (spade), 10(spade); or
4) any other specific combination of the first four cards as specified from time to time.

In some embodiments, according to a further jackpot rule of the present invention, the Paradise Jackpot™ is won if cards drawn in a live baccarat game or felt table game are 5 cards of a kind or 6 cards of a kind. For example, the 5 or 6 cards of a kind can be in one dealer's hand, irrespective of suits or respective of suits. For example, the 5 or 6 cards can all carry number 8 irrespective of suits, or the 5 or 6 cards can all be of Jack irrespective of suits.

The combinations of cards not defined above can be readily derived from time to time with or without the assistance of a computer following established rules of forming combinations of a set of defined members. The amount of Paradise Jackpot™ award can be determined by and distributed according to, e.g., the probability of a combination of cards as defined above or otherwise specified from time to time.

There may be more than one live baccarat game going on simultaneously in different casinos in Macau. In some embodiments, all Paradise Jackpot™ bets from different live baccarat tables will contribute to one grand Paradise Jackpot™ pool. If the Paradise Jackpot™ is won in any one live baccarat table, all players who place Paradise Jackpot™ bets, regardless of the live baccarat table they bet, will share the grand Paradise Jackpot™ pool according to the bet units that each player placed in the jackpot betting.

Paradise Jackpot™ can be played with bets from players as the sole source of the jackpot pool or with bets and an initial contribution from the banker. The term "banker" generally refers to the owner of a gaming establishment operating the live baccarat defined herein or one who operates the live baccarat game. In one embodiment, the banker contributes a sum of money as the initial Paradise Jackpot™ (e.g., HKD 50,000). A certain percentage, e.g., 55%, of the Paradise Jackpot™ bets from the players will be contributed towards the Paradise Jackpot™ pool, a certain percentage (e.g., 40%) of the bets will be collected by the banker as profit, and the remaining portion (e.g., 5%) of the bets will be accumulated as the seed for the next game.

An embodiment of the general gaming method described herein is shown in the flowchart in FIG. 1. The flowchart shows the steps in playing the live baccarat games described herein. Step 110 shows the baccarat is ready to start a game. In step 120, the dealer presses the Start button on the baccarat machine to count-down the time for accepting bets. In step 130, the betting terminal, BU, accepts bets. Step 140 shows that the time for accepting bets is over and the dealer press the Cut-off button on the machine. In step 150, the server, which is also referred to as betting computation and track record central processing unit (BCPU), receives all bets from betting terminals. The dealer then obtains and displays cards in step 160. In step 170, the baccarat game gives results and the dealer presses approve button, approving the card dealing made, game results and payouts. The server, BCPU, then computes and distributes wins in step 180. The live baccarat game is over, as shown in step 190, and the machine is ready for next round of baccarat game that begins with step 110.

In another aspect of the present invention, it is provided a software program or a set of software programs that allows a user or player to any or all of the various aspects of playing the live baccarat Paradise Jackpot™ described herein. The software program can be written by one of ordinary skill in the art.

Gaming System

Figure 2:
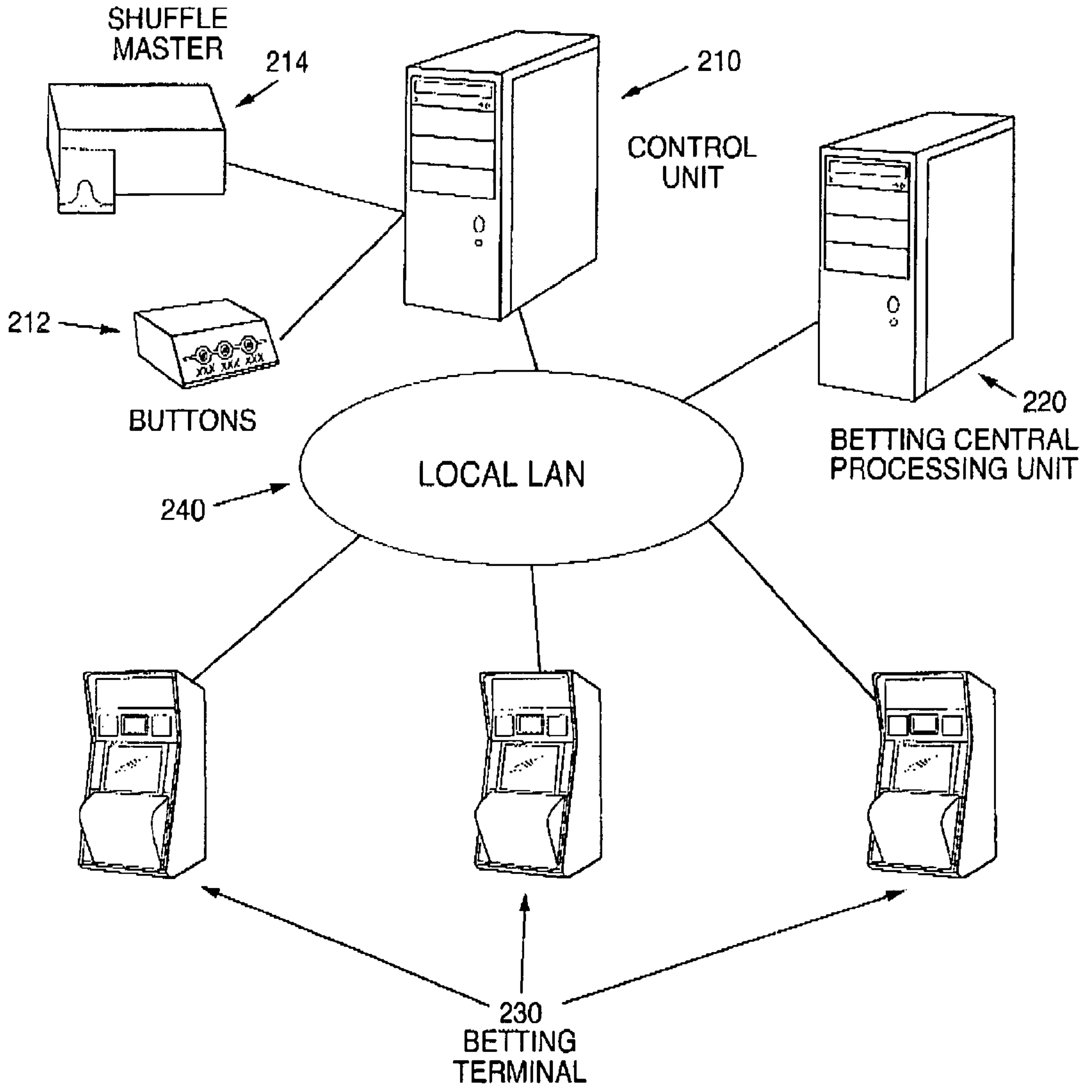
FIG. 2 shows a system embodying live baccarat jackpot of the present invention.

One aspect of the present invention provides a baccarat gaming system that allows one to play the live baccarat jackpot described herein. One embodiment of the present invention is shown in FIG. 2. Referring FIG. 2, the baccarat gaming system includes three members: (1) the control unit for automatic shuffle mechanism (CU) (210), (2) betting computation and tract record central processing unit (BCPU) (220), and (3) betting terminal for players (BT) (230) (FIG. 2). The control unit 210 may further contain control buttons (212) that allows the dealer to control the shuffling mechanism, which can be manual or automatic, and/or a shuffle master (214), which can be manual or automatic, for shuffling the cards. The CU 210 can include any or all of the components which may include control buttons that allow input from dealer and/or capable of (1) receiving the shuffle mechanism input, (2) sending visual output to a screen, and/or (3) sending card results in the player hand and/or bank hand to BCPU 220. The BCPU 220 has components or members capable of performing any or all of (1) receiving betting from BT (230), (2) receiving card results from CU 210, (3) sending betting results to BT 230, and/or (4) sending credit to BT 230.

The betting terminal for players, BT 230, has components or members capable of performing any or all of (1) sending betting to BCPU 220, (2) receiving betting results from BCPU 220, and/or (3) receiving credit from BCPU 220. Note, the baccarat gaming system can have a number of betting terminals, depending on the need of a gaming establishment. For example, if desirable, the baccarat gaming system can have 1, 2, 3, 4, 5, 6, 7, 8, 9, or 10, up to, e.g., 50 or 250 BTs. CU 210, BCPU 220, and BT 230 can be linked together via a local area network (LAN) (240) to form a baccarat gaming network between one, two, three or several gaming establishments.

The live baccarat game can have different variations. For example, the game can be played separately as a single live baccarat game. In some embodiments, the individual baccarat games as played in each betting terminal can be linked together. The individual games can all be played in a casino or gaming establishment or in several casino or gaming establishments. The individual games played in different betting terminals can be the same or different. Therefore, some or all of the baccarat games played in individual betting terminals, which can be the same or different baccarat games, can be linked together for a single jackpot.

Figure 3:
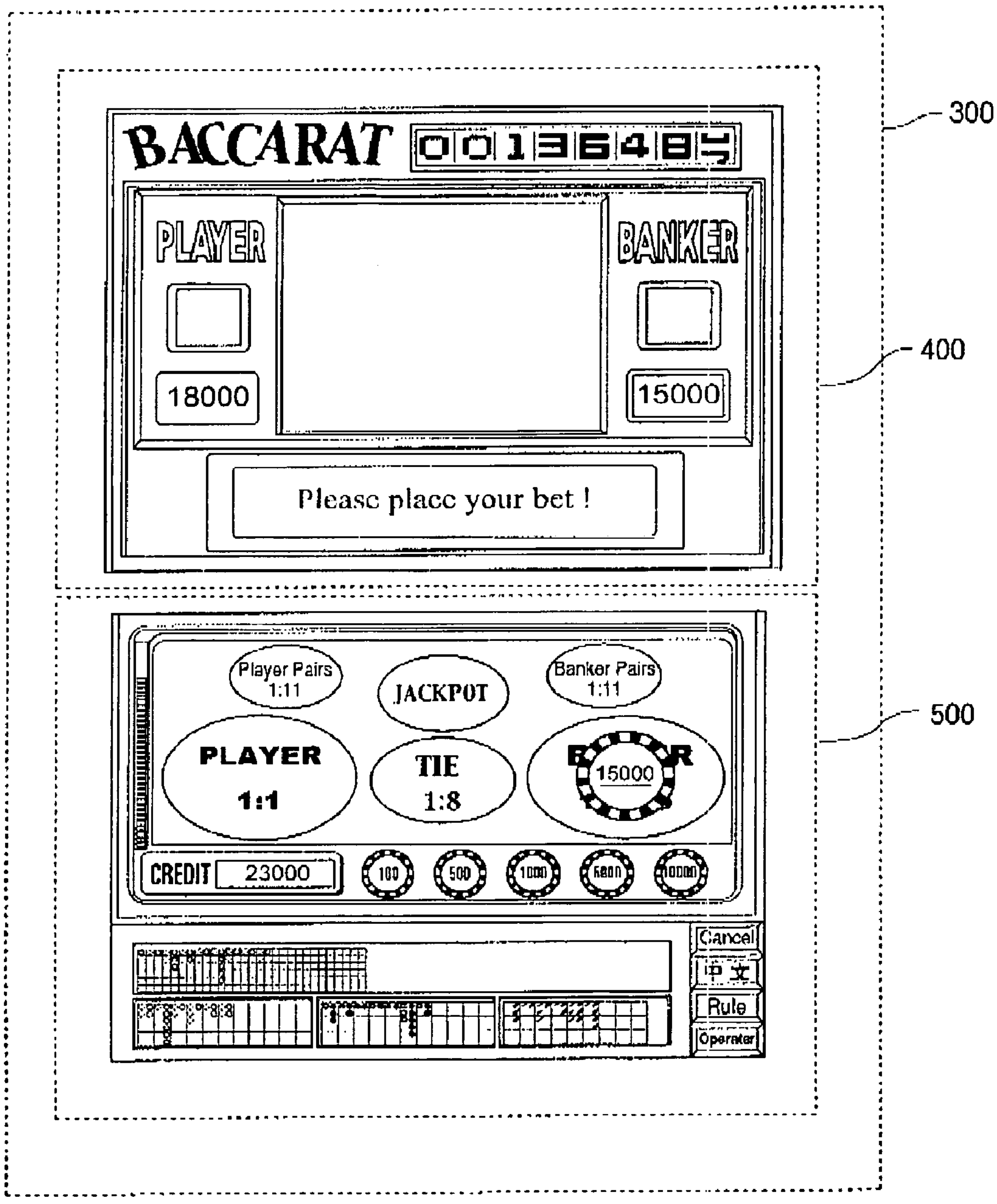
FIG. 3 shows the general layout of a baccarat machine.

A layout for the live baccarat game described herein is shown in FIGS. 3, 4A and 4B. FIG. 3 shows the overall layout of the betting terminal (300), which has two screens, the upper screen (400) and the lower screen (500), shown in detail in FIGS. 4 and B. Referring to FIG. 4A, upper screen 400 includes an upper part (410) for displaying the result, score and latest jackpot amount, the center part (420) for displaying a live video of the gambling table, and a messenger screen (430) for displaying messages. In one embodiment, the jackpot amount digits can be programmed to be in rolling motion to reflect the increasing jackpot pool. The center part of the upper screen has a section designated as Player (440), which has a small screen (450), and another section designated as Banker (460), which also has a small screen (470). The small screens 450 and 470 are for display of card values of the player hand and the bank hand respectively. The current limits available for betting on Player (player hand) and Banker (bank hand) in a live baccarat game are shown in small screens 480 and 490 below small screens 450 and 470, respectively.

Referring to FIG. 4B, the lower screen 500 is an operating touch screen for betting, which includes bet-option buttons (510), bet-amount buttons (520), and credit window (530). The bet-option buttons 510 include the various betting selections described above, e.g., betting for player hand (511) win with a payoff rate of 1:1, for the bank hand (512) win with a payoff rate of 1:0.95, for tie (513) with a payoff rate of 1:8, for Player Pairs (514) with a payoff rate of 1:11, for banker pairs (515) with a payoff rate of 1:11, and for Jackpot bet (516), the rules of which are described above. Box 517 shows the pops up when bets are placed on a particular bet option. The number inside Box 517 corresponds to the amount placed on a particular bet option. The bet-amount buttons 520 as shown in the layout, 100, 500, 1000, 5000, 10000, provide the players the convenience of adding up betting amounts in a fast manner. To illustrate, for a bet of 10,000 USD or HKD, the player can simply press the "1000" button ten times to reach the desired betting amount. Note, the bet-amount buttons 520 shown are illustrative and non-exclusive. Buttons designated for other amounts, e.g., "1", "5", "10", "100", "100,000", "1,000,000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance.

Still referring to FIG. 4, the lower screen 500 further includes language selection button (540), which can switch the operation language of the baccarat game between, e.g., English, Portuguese, Italian, French, Spanish, Russian, German, Arabic, Japanese, and Korean, etc, Rule selection button (550), which prompts the display of rules for live baccarat and Paradise Jackpot™, Cancel button (560), which allows the bettor to cancel all bets made before the cards are dealt, Operator button (570), which allows the bettor to call for assistance from the casino staff when there is machine failure or the bettor wishes to exit from the game, and Results Bars (580, 590) which display the results for previous live baccarat games. Once results of a game are confirmed, the losing bet shown in the bet option buttons (510) in the center of lower screen will disappear while the winning bet in the bet option buttons (510) in the lower screen will flash with the total amount won.

Figure 4C:
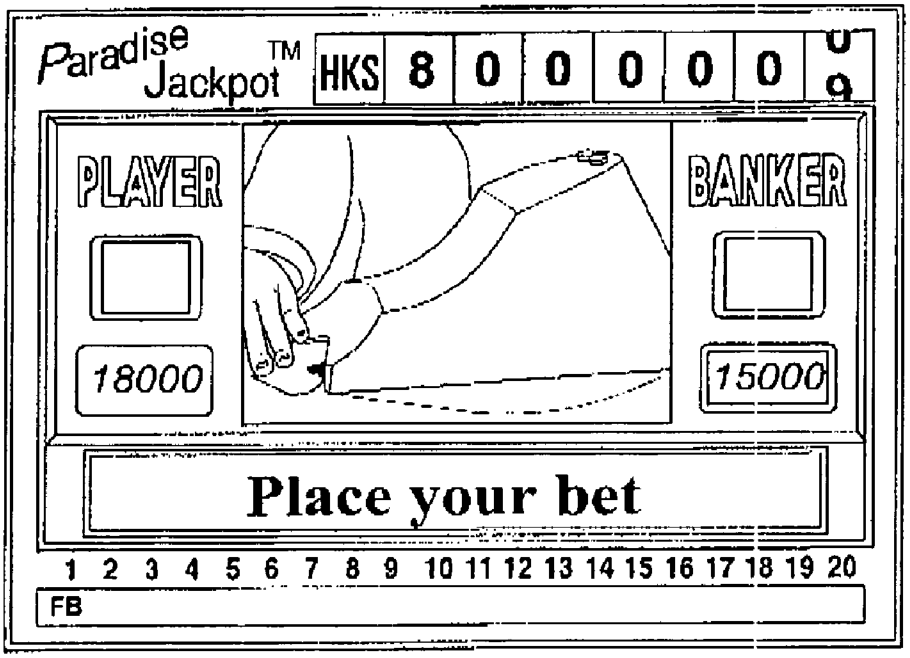
FIGS. 4C and 4D show a variant of the layout of the betting terminal shown in FIGS. 4A and 4B.

FIG. 4C is an alternative design of the upper screen 400 as shown in FIG. 4A, which has a similar layout as the one shown in FIG. 4A except that the top right corner of the upper screen displays the words "Paradise Jackpot™", and the bottom rim has a blank bar and numbers 1 through 20 on top of the bar.

Figure 4D:
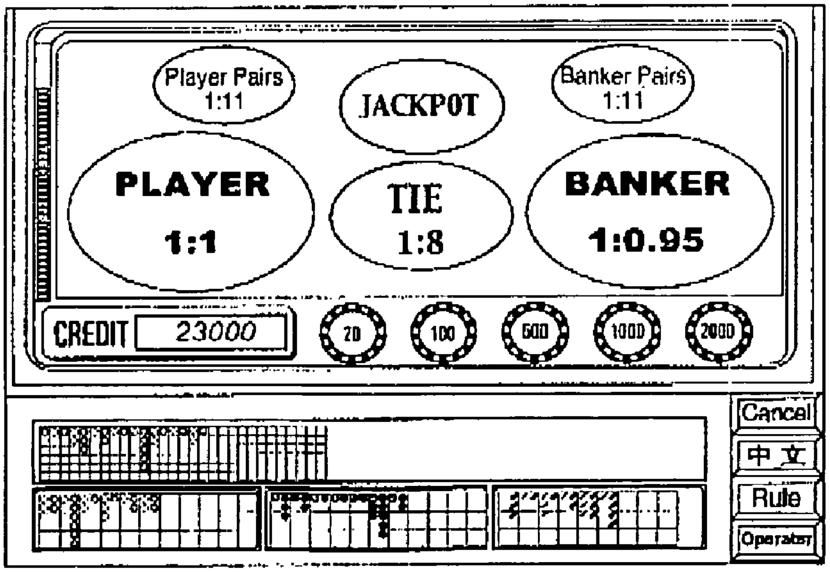

FIG. 4D is an alternative design of the lower screen of 500 as shown in FIG. 4B, which as a similar layout as the one shown in FIG. 4B except that the top rim of the lower screen 500 bears letters indicating the left side as the Player side and the right side and the Banker side, a screen at the far up-left corner indicating the maximum bet on the player hand accepted by the dealing table in a game, and a screen at the far up-right corner indicating the maximum bet on the banker hand accepted by the dealing table in a game.

Figure 5:
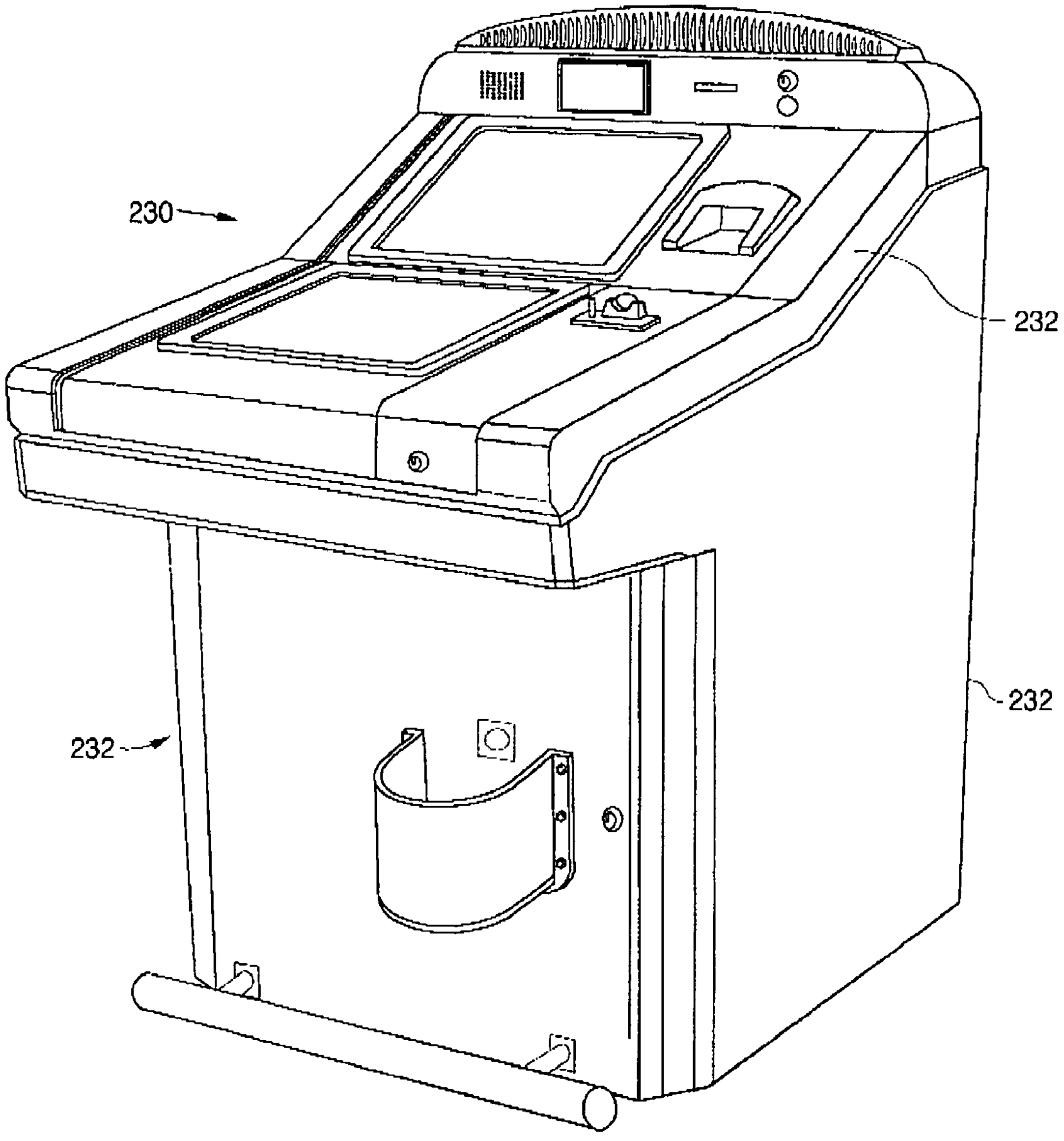
FIG. 5 shows an embodiment of the overall design of the betting terminal.
Figure 6:
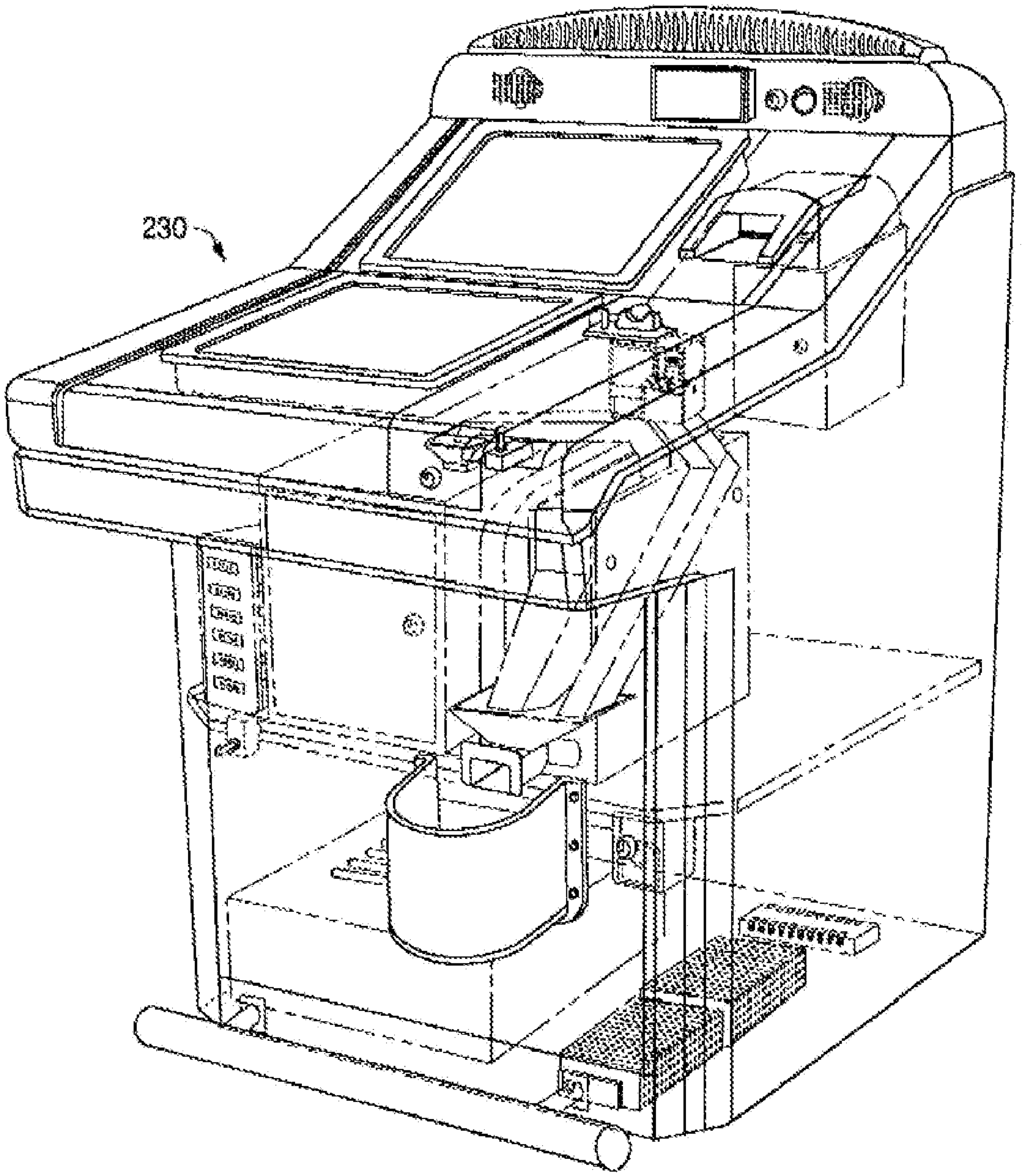
FIG. 6 shows another embodiment of the overall interior design of the betting terminal.

FIGS. 5 and 6 show two embodiments of the betting terminal (BT) 230. FIG. 5 shows an embodiment of BT 230 that has an opaque cover 232. FIG. 6 shows an embodiment of the interior design of BT 230.

Figure 7:
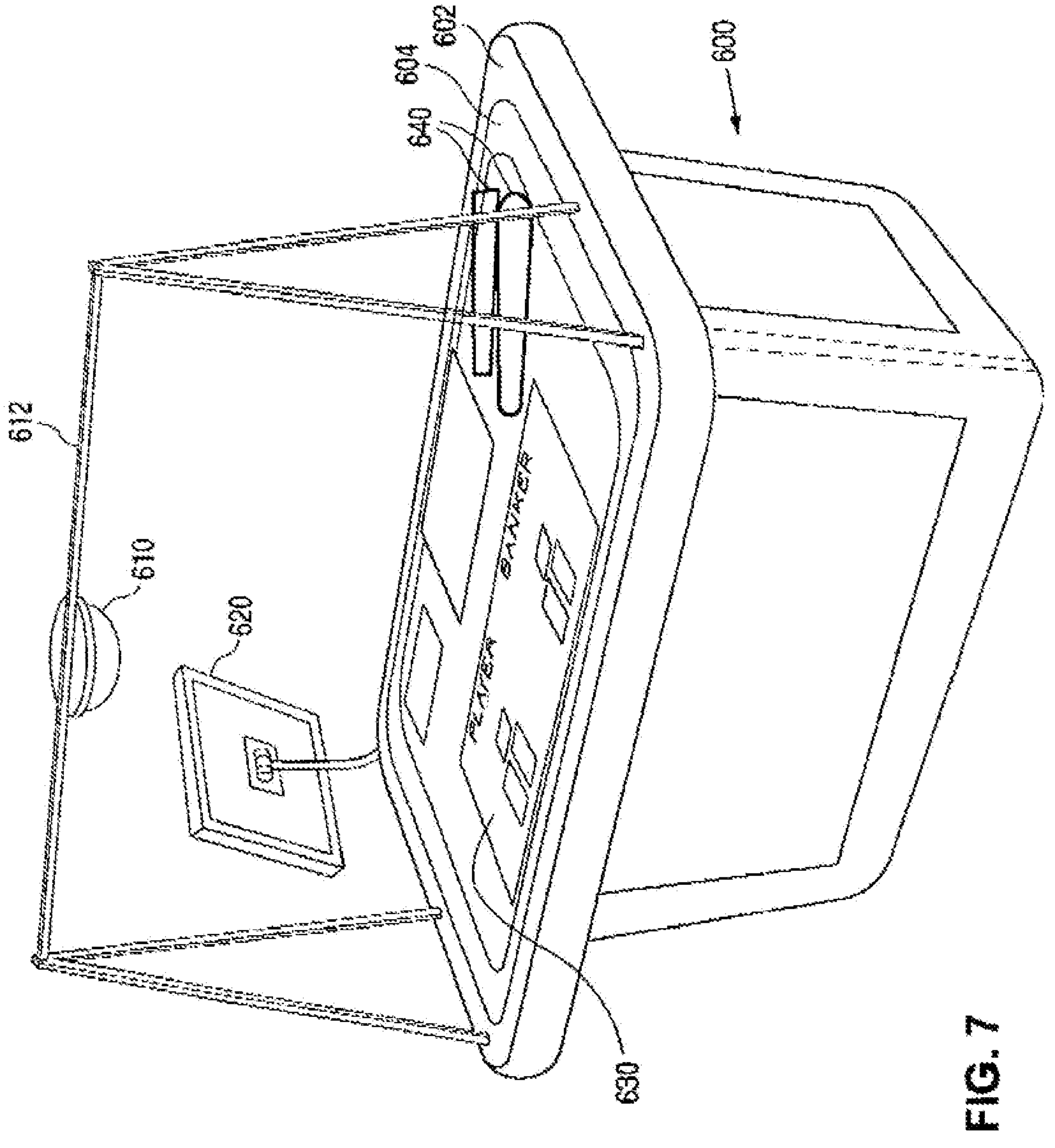
FIG. 7 shows an embodiment of the design of the dealing table.

In some embodiments, the gaming system includes a dealing table. An embodiment of the dealing table is shown in FIG. 7, which includes a main body 600, an overhead video camera 610 supported by a handle 612, a signaling mechanism (e.g., a touch screen) 620 for prompting the dealer of the dealing process, a lighting mechanism 630 for indication of the order the card dealing process, and rings 640 marking the space for placing the card shuffle master and box for disposal of played cards. The main body 600 has an outer rim 602 and inner rim 604.

Figure 8:
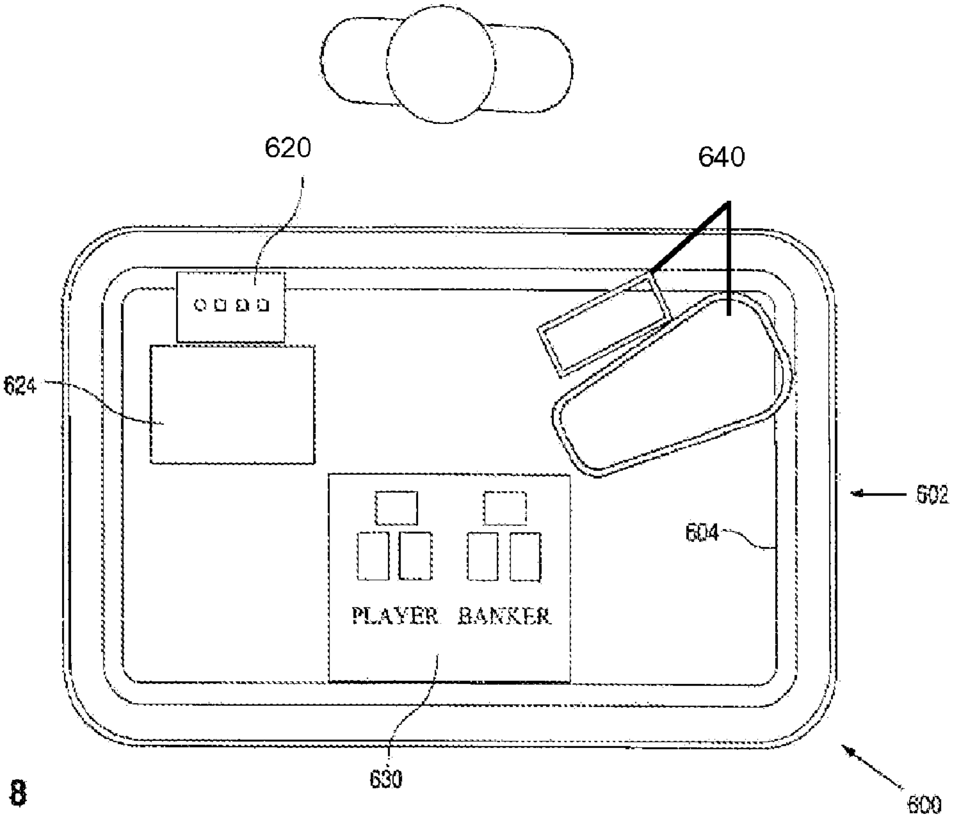
FIG. 8 shows an embodiment of the layout of the dealing table.

Another embodiment of the dealing table is shown in FIG. 8, which has a main body (DT 600), a touch screen 620 that includes a screen 622 and a pop up mechanism 624 for the touch screen, a lighting mechanism 630, and rings 640 marking the space for placing the card shuffle master and box for disposal of played cards. The main body 600 has an outer rim 602 and inner rim 604. In one embodiment, the main body 600 of the dealing table shown in FIG. 8 has an overall dimension of 1600 mm×1000 mm, the outer rim having an outer dimension of 1600 mm×1000 mm and an inner dimension of 1440 mm×840 mm, and the inner rim having an outer dimension of 1440 mm×840 mm and an inner dimension of 1350 mm×750 mm. The touch screen 620 includes a screen 622 having a dimension of 220 mm×130 mm and a pop up mechanism 624 having a dimension of 275 mm. The lighting mechanism has a dimension of 500 mm×400 mm.

Figure 9:
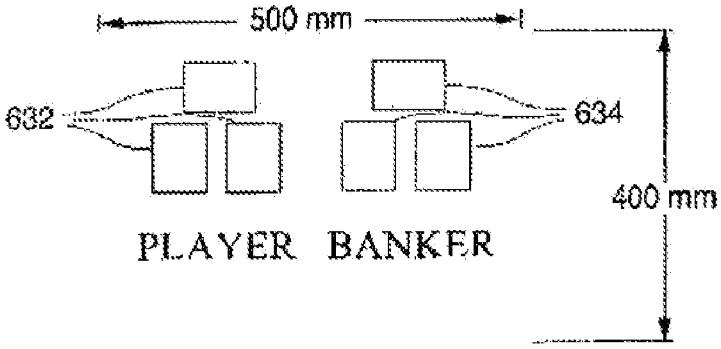
FIG. 9 shows an embodiment of the layout of the dealing table having lights indicating the order of the card dealing process.

FIG. 9 shows an embodiment of the lighting mechanism 630 of the dealing table as shown in FIG. 7 or 8. The lighting mechanism 630 includes lighting 632 indicating the next card shall be dealt to the Player and lighting 634 indicating the next card shall be dealt to the Banker. In one embodiment, the lighting mechanism can have a dimension of 500 mm×400 mm.

Figure 10:
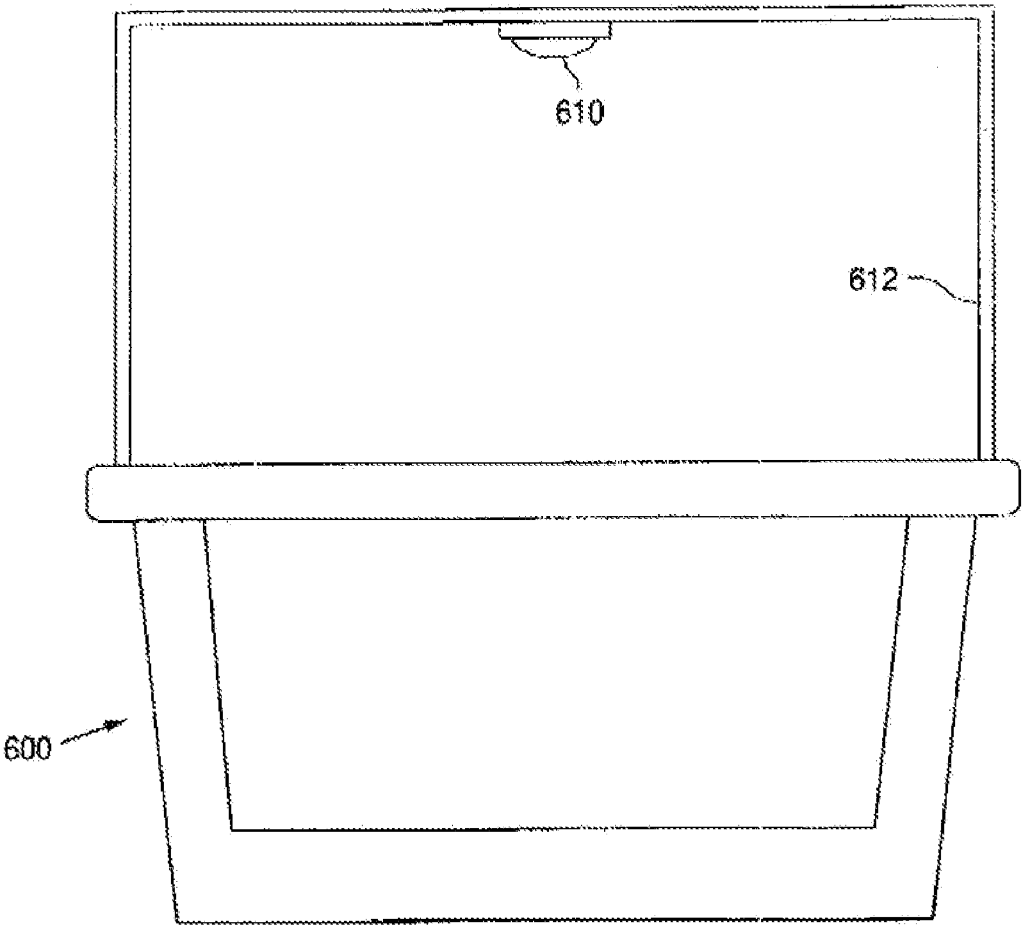
FIG. 10 shows the side view of a design of the dealing table.

FIG. 10 shows a side view of an embodiment of the dealing table of the present invention, which shows the main body 600 and the overhead video camera 610 supported by handle 612. In one embodiment, the main body 600 can have a length of 1600 mm and a height of 850 mm, and handle 612 can have a height of 850 mm.

Figure 11:
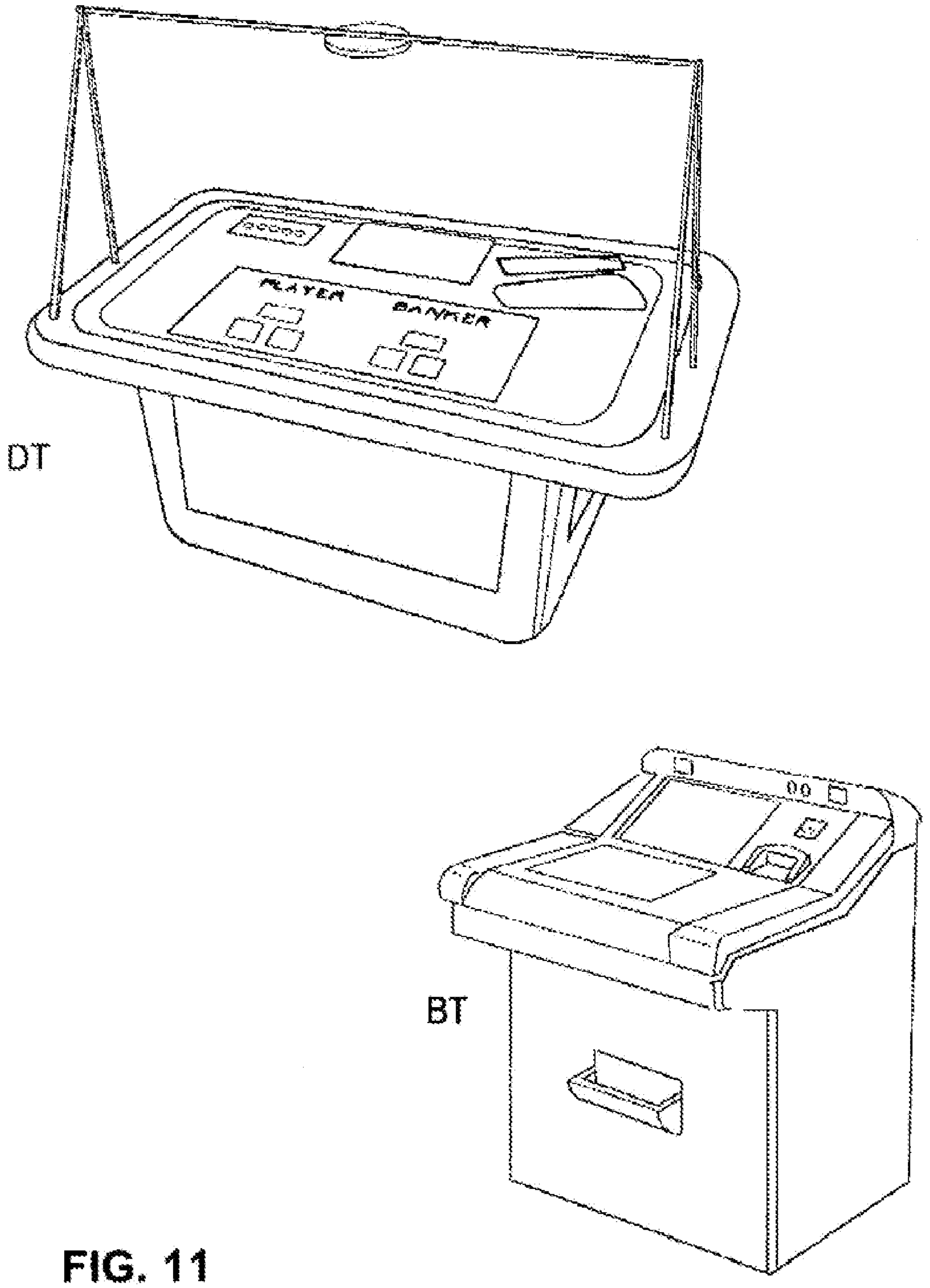
FIG. 11 shows an embodiment of the overall layout of betting terminals and the dealing table.
Figure 12:
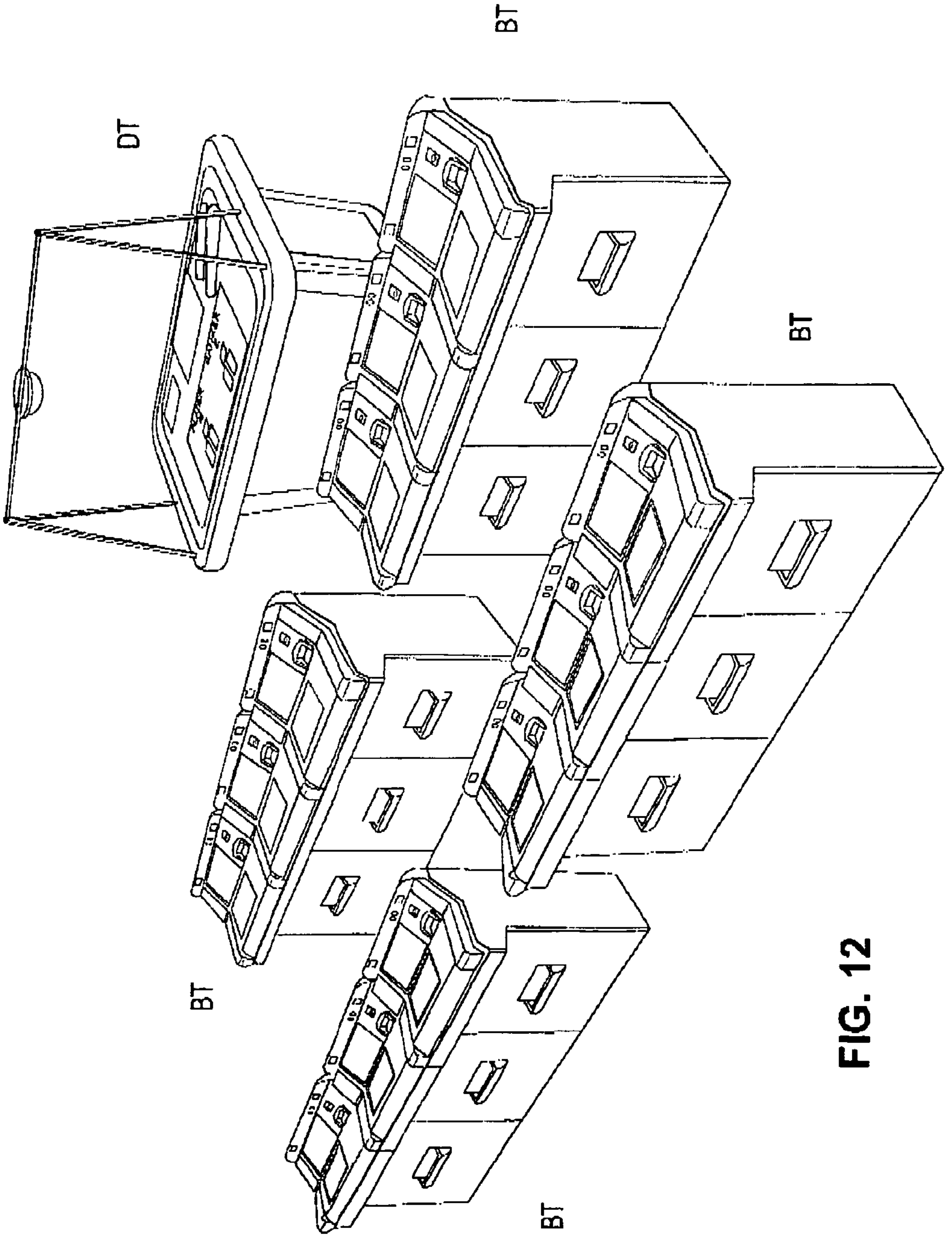
FIG. 12 shows an embodiment of one design of the Live Baccarat of present invention.
Figure 13:
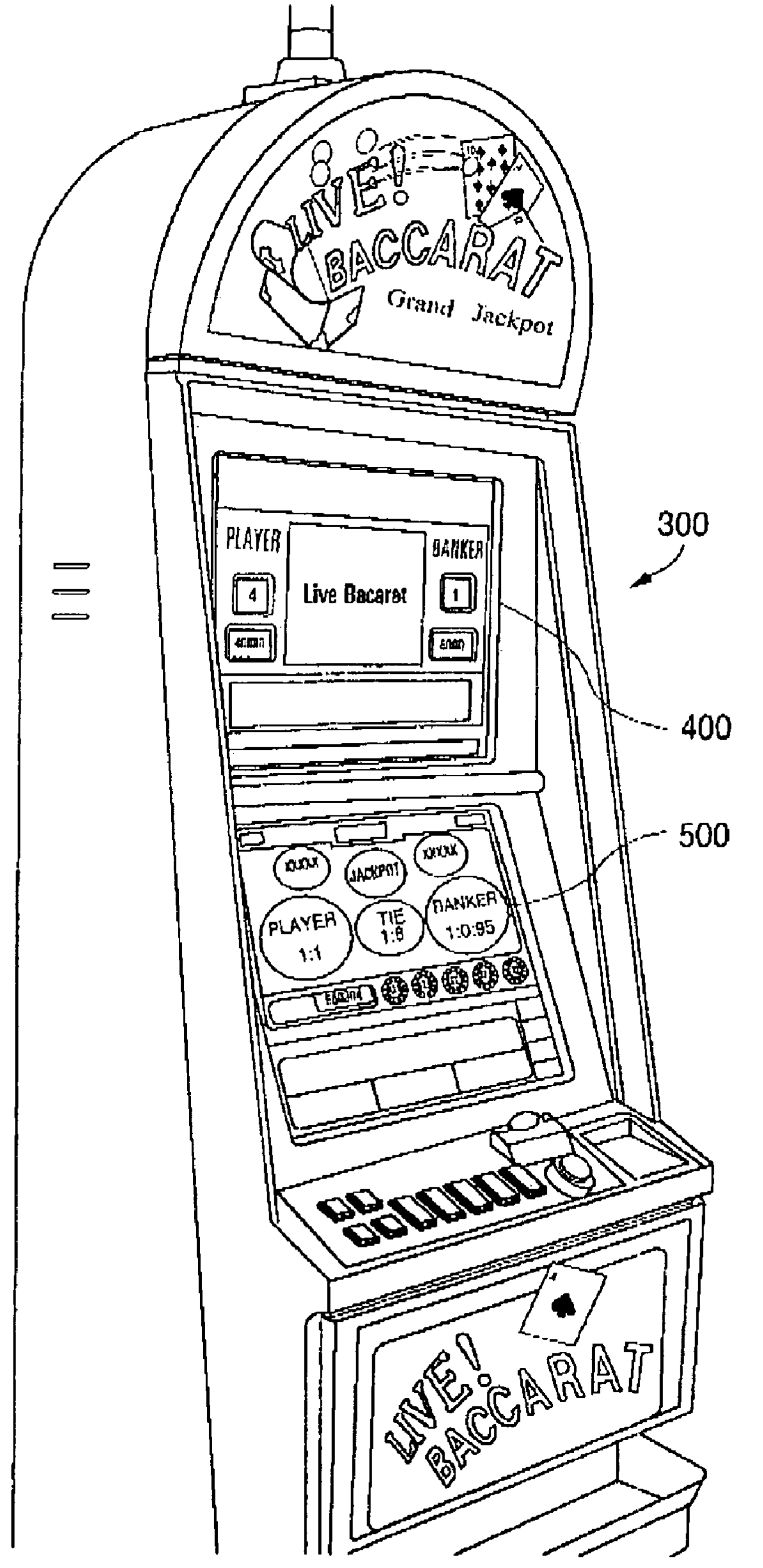
FIG. 13 shows an embodiment of another design of the Live Baccarat betting terminal of the present invention.

FIG. 11 shows an embodiment of the gaming system of the present invention that includes a dealing table and a betting terminal. FIG. 12 shows the overall layout of an embodiment of the gaming system of the present invention, which includes a dealing table and a plurality of betting terminals. FIG. 13 shows the overall layout of a further embodiment of the gaming system of the present invention.

In some other embodiments, the baccarat jackpot game can be played in an entertainment setting, e.g., in the form of game device such as laptop or desktop computers.

In a further embodiment, the baccarat jackpot game can be played in a non-baccarat game, e.g., blackjack, or showhand. The rules of these games other than baccarat games are known to one in the art.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A method of playing a live baccarat or a felt table game which allows a player to bet on a jackpot, the method comprising dealing cards to a player hand and a bank hand according to a set of conventional baccarat rules, including dealing a third card according to a set of conventional baccarat rules, allowing at least a first player to place a bet on the live baccarat or the felt table game, allowing at least a second player to place a bet on the jackpot where the second player can be the same as or different from the first player, determining an outcome of the live baccarat game according to a set of conventional casino game rules, and determining an outcome of the jackpot according to a combination of cards that comprises at least one zero point card, wherein the outcome of the jackpot is determined according to at least a first five cards drawn and a suit of the at least first five cards drawn in a first live baccarat game and a separate jackpot wager bet is accepted at least two live baccarat games contributing to one jackpot pool having a payout for each bet unit equal to the jackpot pool divided by the total number of bet units, and wherein the outcome of the jackpot is a winning jackpot by from about 5% to about 100% of the jackpot.

2. The method of claim 1, wherein a banker who operates the live baccarat or felt table game makes an initial contribution to the jackpot.

3. The method of claim 1, wherein the set of conventional casino game rules are Las Vegas baccarat rules or Macau baccarat rules.

4. The method of claim 3, wherein the bet on live baccarat is selected from the group consisting of a bet on player hand win, a bet on bank hand win, a tie bet, a bet on player pair, and a bet on bank pair, where the bet on player hand win or the bet on bank hand win can combine with any or all of the tie bet, the bet on player pair and the bet on bank pair.

5. The method of claim 1, wherein the jackpot is won by a combination of 5 cards of a kind.

6. The method of claim 1, wherein the jackpot is won by a combination of 6 cards of a kind.

7. The method of claim 5, wherein the 5 cards are in same suit.

8. The method of claim 6, wherein the 6 cards are in different suit.

9. The method of claim 1, wherein the felt table game is a Roulette game, a Black Jack and Craps game, a Sic Bo game, or a Fish-Prawn-Crab game.

10. A non-transitory computer readable medium including a software program or a plurality of software programs implementing a method of playing a live baccarat or a felt table game which allows a player to bet on a jackpot, the method comprising the steps of:

dealing cards to a player hand and a bank hand according to a set of conventional baccarat rules, including dealing a third card according to a set of conventional baccarat rules, allowing at least a first player to place a bet on the live baccarat or the felt table game, allowing at least a second player to place a bet on the jackpot where the second player can be the same as or different from the first player, determining an outcome of the live baccarat game according to a set of conventional casino game rules, and determining an outcome of the jackpot according to a combination of cards that comprises at least one zero point card, wherein the outcome of the jackpot is determined according to at least a first five cards drawn and a suit of the at least first five cards drawn in a first live baccarat game and a separate jackpot wager bet is accepted at least two live baccarat games contributing to one jackpot pool having a payout for each bet unit equal to the jackpot pool divided by the total number of bet units, and wherein the outcome of the jackpot is a winning jackpot by from about 5% to about 100% of the jackpot.

11. The non-transitory computer readable medium of claim 10, wherein the jackpot is won by a combination of 5 cards of a kind.

12. The non-transitory computer readable medium of claim 10, wherein the jackpot is won by a combination of 6 cards of a kind.

13. A system implementing a method of playing a live baccarat or a felt table game which allows a player to bet on a jackpot, the method comprising the steps of:

dealing cards to a player hand and a bank hand according to a set of conventional baccarat rules, including dealing a third card according to a set of conventional baccarat rules, allowing at least a first player to place a bet on the live baccarat or the felt table game, allowing at least a second player to place a bet on the jackpot where the second player can be the same as or different from the first player, determining an outcome of the live baccarat game according to a set of conventional casino game rules, and determining an outcome of the jackpot according to a combination of cards that comprises at least one zero point card, wherein the outcome of the jackpot is determined according to at least a first five cards drawn and a suit of the at least first five cards drawn in a first live baccarat game and a separate jackpot wager bet is accepted at least two live baccarat games contributing to one jackpot pool having a payout for each bet unit equal to the jackpot pool divided by the total number of bet units, and wherein the outcome of the jackpot is a winning jackpot by from about 5% to about 100% of the jackpot.

14. The system of claim 13, wherein the system is an electronic device or entertainment gaming machine.

15. The system of claim 14, wherein the electronic device is a laptop or desktop computer.

16. The system of claim 13, wherein the jackpot is won by a combination of 5 cards of a kind.

17. The system of claim 16, wherein the system is an electronic device or entertainment gaming machine.

18. The system of claim 17, wherein the electronic device is a laptop or desktop computer.

19. The system of claim 13, wherein the jackpot is won by a combination of 6 cards of a kind.

20. The system of claim 19, wherein the system is an electronic device or entertainment gaming machine.

21. The system of claim 20, wherein the electronic device is a laptop or desktop computer.

* * * * *